US012673605B2

(12) United States Patent
Yamashita et al.

(10) Patent No.: US 12,673,605 B2
(45) Date of Patent: Jul. 7, 2026

(54) HEADLIGHT CONTROL DEVICE, HEADLIGHT CONTROL SYSTEM, AND HEADLIGHT CONTROL METHOD

(71) Applicant: MITSUBISHI ELECTRIC MOBILITY CORPORATION, Tokyo (JP)

(72) Inventors: Genki Yamashita, Tokyo (JP); Hiroshi Onodera, Tokyo (JP); Hiroaki Murakami, Tokyo (JP); Wataru Tsujita, Tokyo (JP); Shotaro Miwa, Tokyo (JP); Shinichi Harase, Tokyo (JP); Ryotaro Ebara, Tokyo (JP); Satoru Inoue, Tokyo (JP)

(73) Assignee: MITSUBISHI ELECTRIC MOBILITY CORPORATION, Tokyo (JP)

( * ) Notice: Subject to any disclaimer, the term of this patent is extended or adjusted under 35 U.S.C. 154(b) by 200 days.

(21) Appl. No.: 18/286,013

(22) PCT Filed: May 18, 2021

(86) PCT No.: PCT/JP2021/018692
§ 371 (c)(1),
(2) Date: Oct. 6, 2023

(87) PCT Pub. No.: WO2022/244085
PCT Pub. Date: Nov. 24, 2022

(65) Prior Publication Data
US 2024/0375576 A1 Nov. 14, 2024

(51) Int. Cl.
*B60Q 1/24* (2006.01)
*B60Q 1/08* (2006.01)
*G06T 7/73* (2017.01)

(52) U.S. Cl.
CPC ............. *B60Q 1/249* (2022.05); *B60Q 1/085* (2013.01); *G06T 7/73* (2017.01); *B60Q 2300/45* (2013.01);
(Continued)

(58) Field of Classification Search
CPC .... B60Q 1/249; B60Q 1/085; B60Q 2300/45; G06T 7/73; G06T 2207/10048; G06T 2207/30236
(Continued)

(56) References Cited

U.S. PATENT DOCUMENTS

2004/0189447 A1    9/2004  Okubo et al.
2004/0218401 A1*  11/2004  Okubo ..................... B60Q 1/12
                                                        362/276
(Continued)

FOREIGN PATENT DOCUMENTS

JP          2004-210130 A        7/2004
JP          2004-214023 A        7/2004
(Continued)

OTHER PUBLICATIONS

Enhanced Night Visibility Series, vol. XIII: Phase III—Study 1: Comparison of Near Infrared, Far Infrared, High Intensity Discharge, and Halogen Headlamps on Object Detection in Nighttime Clear Weather. Publication No. FHWA-HRT-04-144 Date: Dec. 2005 (Year: 2005).*
WO2022049648A1 Translated (Year: 2022).*
International Search Report issued Aug. 10, 2021 in PCT/JP2021/018692 filed May 18, 2021.

*Primary Examiner* — Kenneth M Dunne
*Assistant Examiner* — Brian K Palmarchuk
(74) *Attorney, Agent, or Firm* — Birch, Stewart, Kolasch & Birch, LLP

(57) ABSTRACT
A headlight control device includes a saliency map generating unit to generate a saliency map indicating a gaze region that is a region easily gazed by a driver of a vehicle on the
(Continued)

basis of an imaging signal indicating ahead of the vehicle, a scene determining unit to determine a scene that is a situation in which the vehicle is traveling on the basis of the saliency map generated by the saliency map generating unit, and a light distribution control determining unit to determine a light distribution pattern of the headlight on the basis of the scene determined by the scene determining unit, and output a light distribution control signal for controlling the headlight to emit light in the determined light distribution pattern.

12 Claims, 14 Drawing Sheets

(52) U.S. Cl.
CPC .............. *G06T 2207/10048* (2013.01); *G06T 2207/30236* (2013.01)

(58) Field of Classification Search
USPC .......................................................... 701/49
See application file for complete search history.

(56) References Cited

U.S. PATENT DOCUMENTS

| | | | | |
|---|---|---|---|---|
| 2014/0129081 A1* | 5/2014 | Ehlgen | ................. | B60Q 1/0023 |
| | | | | 701/36 |
| 2016/0090025 A1 | 3/2016 | Nagasawa | | |
| 2016/0332568 A1* | 11/2016 | Kim | ........................ | B60Q 1/544 |
| 2022/0289101 A1* | 9/2022 | Iriba | ...................... | B60Q 1/085 |
| 2022/0314870 A1* | 10/2022 | Aimura | .................. | G06V 20/58 |

FOREIGN PATENT DOCUMENTS

| | | | | |
|---|---|---|---|---|
| JP | 2006-21633 A | 1/2006 | | |
| JP | 2009-29227 A | 2/2009 | | |
| JP | 4656429 B2 | 3/2011 | | |
| JP | 4720758 B2 | 7/2011 | | |
| JP | 2014-13524 A | 1/2014 | | |
| JP | 2014-237396 A | 12/2014 | | |
| JP | 2016-68791 A | 5/2016 | | |
| WO | WO-2022049648 A1 * | 3/2022 | ............... | B60Q 1/04 |

* cited by examiner

START

Generate Saliency Map on
Basis of Imaging Signal   ~ST1

Determine Scene on
Basis of Saliency Map   ~ST2

Determine Light Distribution Pattern on
Basis of Scene and
Output Light Distribution Control Signal   ~ST3

END

General Road

Urban Area

Expressway

Wet Road Surface

FIG. 4A
General Road
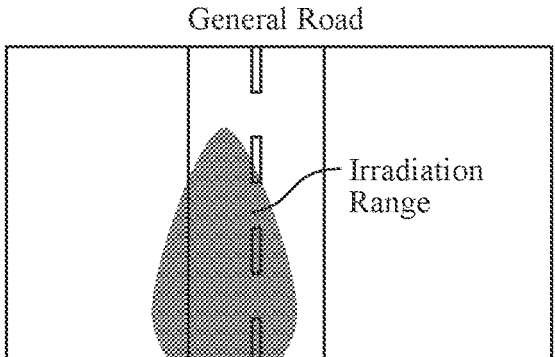
Headlight 3
FIG. 4C
Urban Area
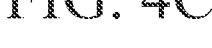
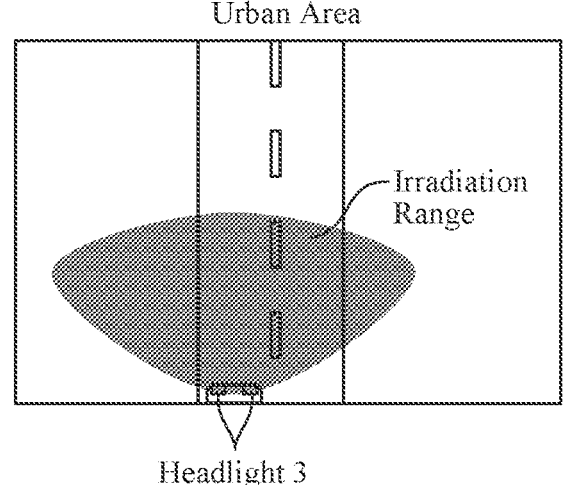
Headlight 3
FIG. 4B
Expressway
Headlight 3
FIG. 4D
Wet Road Surface
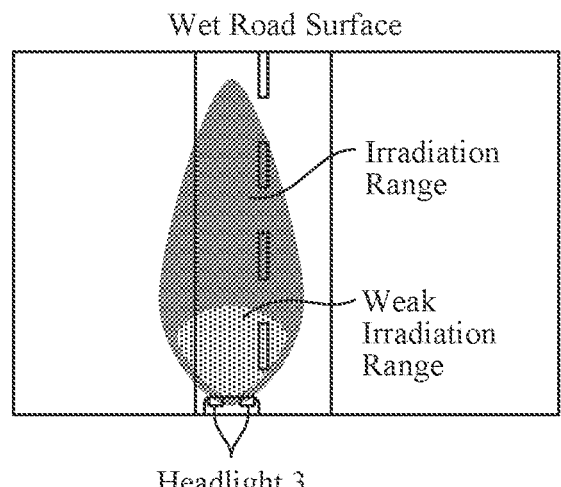
Headlight 3

Uphill Road

Downhill Road

Gradient Increases Ahead of Host Vehicle

Gradient Decreases Ahead of Host Vehicle

FIG. 7A

Left Curve

Gaze Region

FIG. 7B

Right Curve

Gaze Region

Left Curve

Irradiation Range

Headlight 3

Right Curve

Irradiation Range

Headlight 3

Urban Area    Visible Light

Urban Area    Infrared Light

At Low Speed

At Middle Speed

At High Speed

HEADLIGHT CONTROL DEVICE, HEADLIGHT CONTROL SYSTEM, AND HEADLIGHT CONTROL METHOD

TECHNICAL FIELD

The present disclosure relates to a headlight control device.

BACKGROUND ART

In recent years, an adaptive front lighting system (AFS) that automatically controls a headlight for the purpose of improving driver's visibility according to a driving situation and preventing dazzling of traffic users around a vehicle has become widespread.

For example, Patent Literature 1 describes a vehicle headlight device that automatically controls a headlight. The vehicle headlight device automatically controls the light distribution of the headlight on the basis of a lane shape detected by a front monitoring camera and the traveling speed of the vehicle.

CITATION LIST

Patent Literatures

Patent Literature 1: JP 2016-68791 A

SUMMARY OF INVENTION

Technical Problem

In a headlight control device such as the technology described in Patent Literature 1, an object existing ahead of a vehicle is detected on the basis of a captured image captured by a front monitoring camera, and the light distribution of the headlight is automatically controlled on the basis of the detection result.

However, since the headlight control device as described above controls the light distribution of the headlight on the basis of object detection, for example, in a case where the object gazed by the driver is an object that is difficult to detect, a case where the object gazed by the driver is not an object, or the like, there is a possibility that the light distribution of the headlight cannot be controlled so that the headlight irradiates these objects with light.

The present disclosure has been made to solve the above-described problems, and an object thereof is to provide a technique capable of appropriately controlling a light distribution of a headlight so that the headlight irradiates an object gazed by a driver with light.

Solution to Problem

A headlight control device according to the present disclosure is a headlight control device that controls light distribution of a headlight mounted on a vehicle, and includes processing circuitry: to calculate visible saliency on a basis of luminance, color or direction of imaging signals indicating ahead of the vehicle, and generate a saliency map indicating a distribution pattern of a gaze region that is a region easily gazed by a driver of the vehicle on a basis of the calculated visible saliency; to determine a scene that is a situation in which the vehicle is traveling on a basis of a distribution pattern of gaze regions indicated by the saliency map generated; and to determine a light distribution pattern of the headlight on a basis of the scene determined, and output a light distribution control signal for controlling the headlight to emit light in the determined light distribution pattern.

Advantageous Effects of Invention

According to the present disclosure, light distribution of a headlight can be appropriately controlled so that the headlight irradiates an object gazed by a driver with light.

BRIEF DESCRIPTION OF DRAWINGS

FIG. 4A is a diagram illustrating an example of a light distribution pattern determined by a light distribution control determining unit when a scene is determined to be a general road by a scene determining unit according to the first embodiment. FIG. 4B is a diagram illustrating an example of a light distribution pattern determined by the light distribution control determining unit when the scene is determined to be an expressway by the scene determining unit according to the first embodiment. FIG. 4C is a diagram illustrating an example of a light distribution pattern determined by the light distribution control determining unit when the scene is determined to be an urban area by the scene determining unit according to the first embodiment. FIG. 4D is a diagram illustrating an example of a light distribution pattern determined by the light distribution control determining unit when the scene is determined to be a wet road surface by the scene determining unit according to the first embodiment.

FIG. 7A illustrates an example of a saliency map in a case where the vehicle is traveling in a left curve section. FIG. 7B illustrates an example of a saliency map in a case where the vehicle is traveling in a right curve section.

DESCRIPTION OF EMBODIMENTS

Hereinafter, in order to describe the present disclosure in more detail, embodiments for carrying out the present disclosure will be described with reference to the accompanying drawings.

First Embodiment

Figures 1, 2:
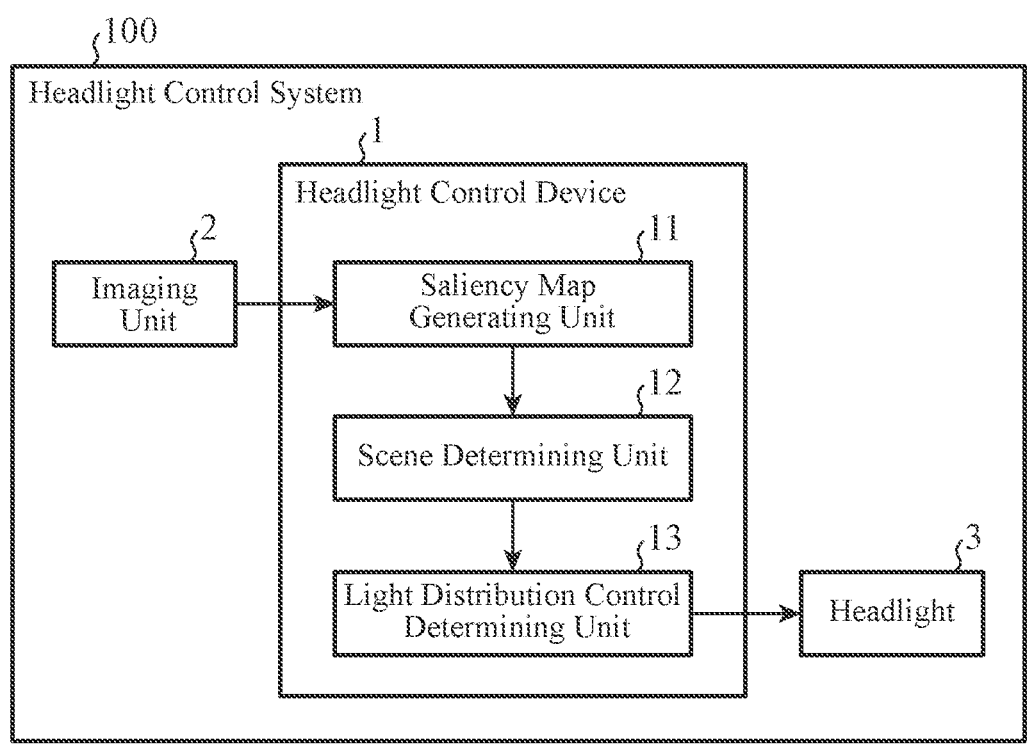
FIG. 1 is a block diagram illustrating a configuration of a headlight control system according to a first embodiment.
FIG. 2 is a flowchart illustrating a headlight control method performed by the headlight control device according to the first embodiment.

FIG. 1 is a block diagram illustrating a configuration of a headlight control system 100 according to a first embodiment. As illustrated in FIG. 1, the headlight control system 100 includes a headlight control device 1, an imaging unit 2, and a headlight 3. The headlight control device 1 includes a saliency map generating unit 11, a scene determining unit 12, and a light distribution control determining unit 13.

The headlight control device 1 controls light distribution of a headlight 3 mounted on a vehicle. More specifically, the headlight control device 1 is mounted on a vehicle such as an automobile, and is configured to be capable of automatically controlling the light distribution of the headlight 3 depending on the scene. Note that, in the present description, the term "vehicle" means a vehicle (host vehicle) on which the headlight control system 100 is mounted. As used herein, the term "scene" is intended to mean a situation in which a vehicle is traveling. As an example of the situation, it means a road on which a vehicle is traveling, such as a general road, an expressway, a wet road surface, a slope having a gradient (uphill road, downhill road, and the like) or a curve, or a surrounding environment of a road on which a vehicle is traveling, such as an urban area.

More specifically, although not illustrated, in the first embodiment, the headlight control device 1 is connected to a computer network (for example, a controller area network (CAN)) in the vehicle, and can appropriately acquire various information (hereinafter referred to as "vehicle information") from the vehicle. The vehicle information includes, for example, information indicating on/off of the light switch.

The light switch is configured to be capable of performing a setting for switching between a turn-on state and a turn-off state of the headlight 3 and a setting for whether or not to automatically perform headlight control. When the light switch is operated to automatically execute the headlight control, the automatic control of the headlight 3 by the headlight control device 1 functions.

More specifically, in the first embodiment, the headlight control device 1 acquires at least an imaging signal from the imaging unit 2 to be described later, determines the light distribution pattern and the optical axis of the headlight 3 depending on the above-described scene in which the vehicle is traveling on the basis of the acquired imaging signal, and outputs the light distribution control signal to the headlight 3. Note that, in the present description, the term "light distribution pattern" means a range irradiated with light by the headlight 3, illuminance of light irradiated by the headlight 3, or the like.

More specifically, in the first embodiment, the headlight control device 1 includes at least the saliency map generating unit 11 that generates a saliency map on the basis of an imaging signal, the scene determining unit 12 that determines a scene on the basis of the saliency map, and the light distribution control determining unit 13 that determines a light distribution pattern on the basis of the determined scene and outputs a light distribution control signal.

The imaging unit 2 images ahead of the vehicle to acquire an image indicating ahead of the vehicle, and converts the acquired image into an imaging signal. More specifically, the imaging unit 2 is, for example, a front monitoring camera that acquires a visible light moving image by imaging ahead of the vehicle. The imaging unit 2 converts the captured moving image into an imaging signal, and outputs the converted imaging signal to the headlight control device 1. Note that, in the first embodiment, a configuration in which the imaging unit 2 is a front monitoring camera and outputs an imaging signal will be described, but for example, a light detection and ranging (LiDAR), a time of flight (ToF) camera, a millimeter wave radar, an ultrasonic sensor, or the like may be used as the imaging unit 2. In this case, the imaging unit 2 may output an image indicating the measured measurement result as an imaging signal.

The headlight 3 emits light to ahead of the vehicle on the basis of the light distribution control signal output from the headlight control device 1. In more detail, in the first embodiment, the headlight 3 emits light to the front of the vehicle in a light distribution pattern indicated by a light distribution control signal output by the headlight control device 1. More specifically, in the first embodiment, the headlight 3 includes a lamp having a function such as a low beam, a high beam, or a spot beam, is configured to be capable of adjusting an irradiation range and an irradiation amount, and is configured to be capable of emitting light in various light distribution patterns on the basis of the light distribution control signal.

The saliency map generating unit 11 of the headlight control device 1 generates a saliency map indicating visual saliency ahead of the vehicle on the basis of an imaging signal indicating the front of the vehicle. In more detail, in the first embodiment, the saliency map generating unit 11 generates a saliency map indicating a gaze region that is a region easily gazed by the driver of the vehicle on the basis of the imaging signal converted by the imaging unit 2. The saliency map generating unit 11 outputs the generated saliency map to the scene determining unit 12.

More specifically, in the first embodiment, the saliency map generated by the saliency map generating unit 11 is a map obtained by calculating, for each pixel, ease of gaze when a person views an image showing the front of the vehicle, and reflects a distribution pattern of a gaze region that is a region that a driver of the vehicle easily gazes at.

Examples of the saliency map generated by the scene determining unit 12 include a saliency map (see, for example, "L. Itti, and C. Koch, "A saliency-based search mechanism for overt and covert shift of visual attention", Vision Research, Vol. 40, pp. 1489 to 1506, 2000") for detecting the gaze region in the imaging signal.

Examples of a saliency calculation method for generating the saliency map by the saliency map generating unit 11 include a method of calculating saliency on the basis of luminance, color, orientation, or the like in an image, a method applying deep learning such as a neural network, or the like.

The scene determining unit 12 of the headlight control device 1 determines a scene that is a situation in which the vehicle is traveling on the basis of the saliency map generated by the saliency map generating unit 11. In more detail, in the first embodiment, the scene determining unit 12 determines a scene that is a situation in which the vehicle is traveling on the basis of the distribution pattern of the gaze region indicated by the saliency map generated by the saliency map generating unit 11. The scene determining unit 12 outputs information regarding the determined scene to the light distribution control determining unit 13.

More specifically, in order to determine the optimum light distribution pattern, the scene determining unit 12 according to the first embodiment determines a scene related to the type of road on which the vehicle is traveling, such as a general road, an expressway, or a wet road surface, or a scene related to the surrounding environment or the like of the road on which the vehicle is traveling, such as an urban area. Alternatively, the scene determining unit 12 according to the first embodiment determines a scene such as a slope having a gradient or a curve in order to determine a light distribution pattern corresponding to the slope having the gradient or the curve. Note that details of a scene determination method based on the distribution pattern of the gaze region by the scene determining unit 12 will be described later.

The light distribution control determining unit 13 of the headlight control device 1 determines the light distribution pattern of the headlight 3 on the basis of the scene determined by the scene determining unit 12, and outputs a light distribution control signal for controlling the headlight 3 to emit light in the determined light distribution pattern. The headlight 3 described above emits light in the light distribution pattern determined by the light distribution control determining unit 13 on the basis of the light distribution control signal output by the light distribution control determining unit 13. Note that details of a method of determining the light distribution pattern by the light distribution control determining unit 13 will be described later.

Hereinafter, the operation of the headlight control device 1 according to the first embodiment will be described with reference to the drawings. FIG. 2 is a flowchart illustrating a headlight control method performed by the headlight control device 1 according to the first embodiment. Note that, before each step described below, it is assumed that the imaging unit 2 acquires an image indicating the front of the vehicle by imaging the front of the vehicle, and converts the acquired image into an imaging signal.

As illustrated in FIG. 2, the saliency map generating unit 11 generates a saliency map indicating visual saliency ahead of the vehicle on the basis of the imaging signal converted by the imaging unit 2 (step ST1). The saliency map generating unit 11 outputs the generated saliency map to the scene determining unit 12.

Next, the scene determining unit 12 determines a scene that is a situation where the vehicle is traveling on the basis of the saliency map generated by the saliency map generating unit 11 (step ST2). The scene determining unit 12 outputs information regarding the determined scene to the light distribution control determining unit 13.

Next, the light distribution control determining unit 13 determines the light distribution pattern of the headlight 3 on the basis of the scene determined by the scene determining unit 12, and outputs a light distribution control signal for controlling the headlight 3 to emit light in the determined light distribution pattern (step ST3).

Next, a specific example of an operation (step ST2) of the scene determining unit 12 according to the first embodiment will be described with reference to the drawings. FIG. 3 is a diagram for explaining the saliency map generated by the saliency map generating unit 11 according to the first embodiment. Hereinafter, as a specific example of the operation of the scene determining unit 12 according to the first embodiment, a method of determining a scene related to the type of road on which the vehicle is traveling, such as a general road, an expressway, or a wet road surface, or a scene related to the surrounding environment or the like of the road on which the vehicle is traveling, such as an urban area, will be described with reference to FIG. 3.

Figure 3A:
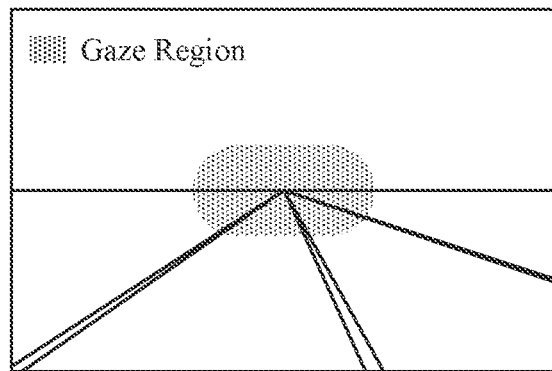
FIG. 3A is a diagram illustrating an example of a distribution of a gaze region in a saliency map in a case where a vehicle is traveling on a general road.

FIG. 3A is a diagram illustrating an example of a distribution of gaze regions in a saliency map in a case where the vehicle is traveling on a general road. FIG. 3A illustrates a distribution pattern of gaze regions corresponding to a traveling direction of the vehicle.

Figure 3C:
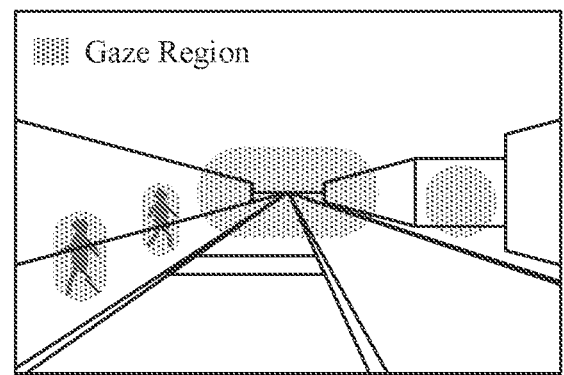
FIG. 3C is a diagram illustrating an example of a distribution of gaze regions in a saliency map in a case where the vehicle is traveling on a road in an urban area.
Figure 3B:
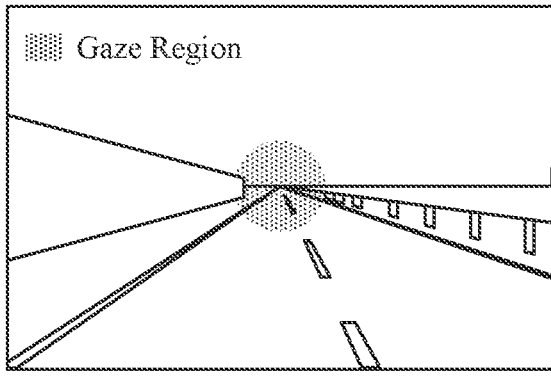
FIG. 3B is a diagram illustrating an example of a distribution of a gaze region in a saliency map in a case where the vehicle is traveling on an expressway.

FIG. 3B is a diagram illustrating an example of a distribution of a gaze region in the saliency map in a case where the vehicle is traveling on an expressway. FIG. 3B illustrates a distribution pattern of the gaze region corresponding to the traveling direction of the vehicle.

FIG. 3C is a diagram illustrating an example of a distribution of gaze regions in the saliency map in a case where the vehicle is traveling on a road in an urban area. FIG. 3C illustrates distribution patterns of a gaze region corresponding to the traveling direction of the vehicle, a gaze region corresponding to an obstacle on the shoulder, and a gaze region corresponding to a position in the shadow of the obstacle on the shoulder.

Figure 3D:
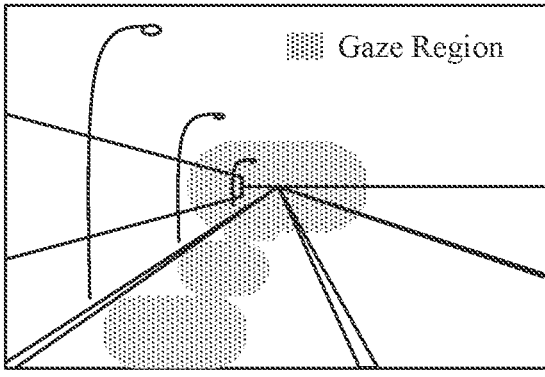
FIG. 3D is a diagram illustrating an example of a distribution of gaze regions in a saliency map in a case where the vehicle is traveling on a wet road surface.

FIG. 3D is a diagram illustrating an example of a distribution of gaze regions in the saliency map in a case where the vehicle is traveling on a wet road surface. FIG. 3D illustrates distribution patterns of a gaze region corresponding to the traveling direction of the vehicle and gaze regions corresponding to the reflection on the wet road surface.

As illustrated in FIGS. 3A, 3B, 3C, and 3D, in a case where the vehicle is traveling on a general road, an expressway, a road in an urban area, or a wet road surface, the distribution patterns of gaze regions indicated by the saliency map generated by the saliency map generating unit 11 are different.

As described above, with the headlight control device 1 according to the first embodiment, since the saliency map generating unit 11 can generate the saliency map indicating the distribution pattern of gaze regions having features for each scene, it is possible to detect, as the gaze regions, a portion where there is no object that cannot be detected by object detection by a conventional camera, for example, a traveling direction of the vehicle or a position where a pedestrian may jump out, and it is possible to appropriately determine the scene to perform light distribution control.

The scene determining unit 12 determines that the scene is a general road, an expressway, or an urban area on the basis of a distribution pattern in a horizontal direction of gaze regions indicated by the saliency map generated by the saliency map generating unit 11. More specifically, in the first embodiment, in a case where gaze regions are distributed around a region ahead in the traveling direction of the vehicle and the distribution pattern of the gaze regions has a standard spread in the saliency map, the scene determining unit 12 determines that the scene is a general road.

Alternatively, in a case where gaze regions are distributed around a region ahead in the traveling direction of the vehicle in the saliency map, and the distribution pattern of the gaze regions is concentrated on a vanishing point as compared with the standard spread, the scene determining unit 12 determines that the scene is an expressway.

Alternatively, the scene determining unit 12 determines that the scene is an urban area in a case where the distribution pattern of gaze regions is widely distributed to the left and right from the standard spread with the region ahead in the traveling direction of the vehicle as the center in the saliency map.

Alternatively, in a case where the distribution pattern of gaze regions is distributed on the road surface in the saliency map, the scene determining unit 12 determines that the scene is a wet road surface.

More specifically, the scene determining unit 12 calculates probability density distributions of gazes in a horizontal direction and a vertical direction on the basis of the saliency map, and determines a scene by evaluating features of the calculated probability density distributions.

For example, in a case where the calculated probability density distribution of the gaze in the horizontal direction includes a single distribution, the scene determining unit 12 determines a scene of a general road, an expressway, an urban area, or the like by evaluating a width of the distribution and performing threshold determination.

Alternatively, for example, in a case where the calculated probability density distribution in the horizontal direction includes a plurality of distributions, the scene determining unit 12 further determines a scene of a general road, an expressway, an urban area, or the like by determining a width of the distribution corresponding to the traveling direction, or the number of distributions or variance of distributions.

For example, the scene determining unit 12 may evaluate the calculated probability density distribution of gaze in the vertical direction, and determine that the scene is a wet road surface when the tail of the distribution spreads in the region corresponding to the road surface, and when there is a plurality of distributions in the region corresponding to the road surface.

Note that the scene determining unit 12 may be configured to determine the scene by evaluating the number of clusters, the position of each cluster, the probability density of each cluster, or variance of each cluster by clustering gaze regions from a two-dimensional probability density distribution calculated on the basis of the saliency map. Alternatively, a database of the saliency map corresponding to the scene desired to be determined may be constructed in advance, and the scene determining unit 12 may include a determiner learned in advance on the basis of the database.

Hereinafter, a specific example of the operation (step ST3) of the light distribution control determining unit 13 based on the scene determined by the scene determining unit 12 according to the first embodiment will be described. FIG. 4 is a diagram illustrating an example of a light distribution pattern based on a scene determination result.

FIG. 4A is a diagram illustrating an example of a light distribution pattern determined by the light distribution control determining unit 13 when the scene is determined to be a general road by the scene determining unit 12 according to the first embodiment.

FIG. 4B is a diagram illustrating an example of the light distribution pattern determined by the light distribution control determining unit 13 when the scene is determined to be an expressway by the scene determining unit 12 according to the first embodiment. Since the vehicle travels at a higher speed on an expressway than on a general road, the light distribution control determining unit 13 performs control so that the headlight 3 emits light in a light distribution pattern that expands the irradiation range to a distant place as compared with a case where the vehicle is traveling on a general road. This improves driver's visibility when the vehicle is traveling at a high speed.

FIG. 4C is a diagram illustrating an example of the light distribution pattern determined by the light distribution control determining unit 13 when the scene is determined to be an urban area by the scene determining unit 12 according to the first embodiment. Since the driver needs to pay attention to an obstacle on a road shoulder in an urban area, the light distribution control determining unit 13 performs control so that the headlight 3 emits light in a light distribution pattern that expands the irradiation range in a left-right direction as compared with a case where the vehicle is traveling on a general road. By expanding the irradiation range in the left-right direction in this manner, the visibility for the driver is improved. At the same time, the light distribution control determining unit 13 controls the headlight 3 to emit light in a light distribution pattern that limits an irradiation range distant from the vehicle. Since illuminance is ensured by streetlamps in urban areas, dazzling to surrounding traffic users is prevented by limiting the irradiation range far from the vehicle in this manner.

FIG. 4D is a diagram illustrating an example of the light distribution pattern determined by the light distribution control determining unit 13 when the scene is determined to be a wet road surface by the scene determining unit 12 according to the first embodiment. When the vehicle is traveling on a wet road surface, there is a possibility that surrounding traffic users are dazzled by specularly reflected light of the road surface, and thus the light distribution control determining unit 13 performs control so that the headlight 3 emits light in a light distribution pattern that limits irradiation intensity of a region contributing to specular reflection. This prevents dazzling of traffic users around the host vehicle. At the same time, the light distribution control determining unit 13 controls the headlight 3 to emit light in a light distribution pattern that enlarges the irradiation range farther from the vehicle as compared with a case where the vehicle is traveling on a general road. This improves driver's visibility.

On the basis of the scene determined by the scene determining unit 12, the light distribution control determining unit 13 determines a light distribution pattern corresponding to the scene as illustrated in FIG. 4, and outputs a light distribution control signal for controlling the headlight 3 to emit light in the determined light distribution pattern. Thus, an optimum light distribution pattern according to the scene is output. Note that the light distribution pattern described above is a representative example, and the irradiation range, illuminance, or the like may be appropriately changed.

Hereinafter, a further specific example of an operation (step ST2) of the scene determining unit 12 according to the first embodiment will be described with reference to the drawings. In more detail, in the further specific example, a method in which the scene determining unit 12 determines a scene related to a slope having a gradient will be described. FIG. 5 illustrates an example of a saliency map in a case where a slope gradient changes ahead of the vehicle.

In this specific example, the scene determining unit 12 determines whether or not the scene is a slope having a gradient on the basis of the displacement in the vertical direction of the gaze region indicated by the saliency map generated by the saliency map generating unit 11.

Figure 5A:
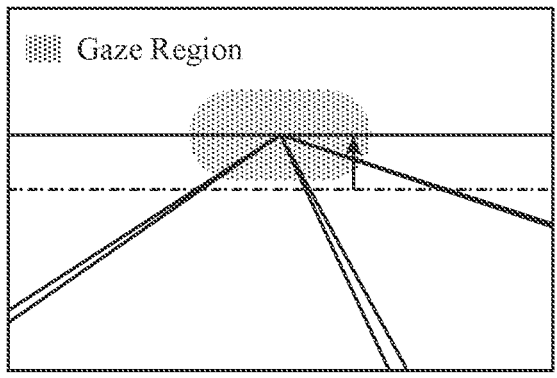
FIG. 5A illustrates an example of a saliency map in a case where a slope gradient increases ahead of the vehicle.

FIG. 5A illustrates an example of the saliency map in a case where the slope gradient increases ahead of the vehicle. FIG. 5A illustrates that, in a case where the slope gradient increases ahead of the vehicle, the gaze region corresponding to the traveling direction of the vehicle is displaced upward with reference to the gaze region in a case where the vehicle is traveling on a flat road. Therefore, when the gaze region indicated by the saliency map generated by the saliency map generating unit 11 is displaced upward, the scene determining unit 12 determines that the scene is an uphill road having an upward gradient.

Figure 5B:
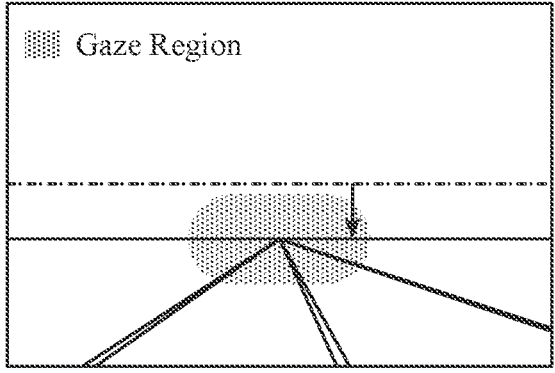
FIG. 5B illustrates an example of a saliency map in a case where the slope gradient decreases ahead of the vehicle.

FIG. 5B illustrates an example of the saliency map in a case where the slope gradient decreases ahead of the vehicle. FIG. 5B illustrates that, in a case where the slope gradient decreases ahead of the vehicle, the gaze region corresponding to the traveling direction of the vehicle is displaced downward with reference to the gaze region in a case where the vehicle is traveling on a flat road. Therefore, when the gaze region indicated by the saliency map generated by the saliency map generating unit 11 is displaced downward, the scene determining unit 12 determines that the scene is a downhill road having a downward gradient.

As described above, in the specific example, the scene determining unit 12 determines that the scene is a slope having a gradient in a case where the gaze region is displaced up or down with reference to the gaze region in a case where the vehicle is traveling on a flat road.

Hereinafter, a further specific example of an operation (step ST3) of the light distribution control determining unit 13 based on the scene determined by the scene determining unit 12 according to the first embodiment will be described with reference to the drawings. FIG. 6 illustrates an example of optical axis control in a case where a vehicle is traveling in a section where a slope gradient changes.

In this specific example, when the scene determining unit 12 determines that the scene is a slope, the light distribution control determining unit 13 adjusts the light distribution pattern so as to move the light emitted from the headlight 3 in the vertical direction.

Figure 6A:
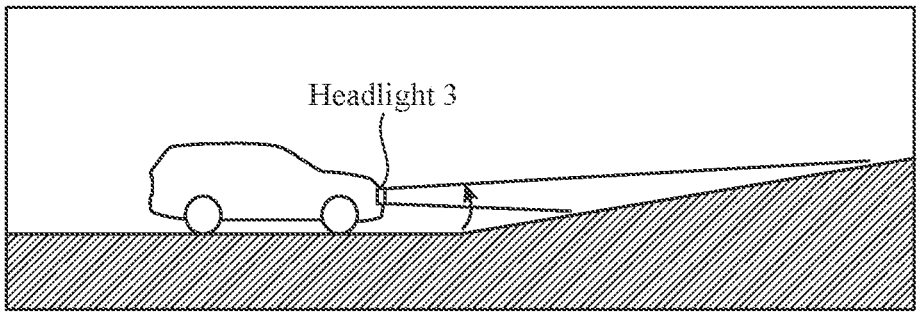
FIG. 6A illustrates an example of an optical axis of a headlight in a case where a slope gradient increases ahead of the vehicle.

FIG. 6A illustrates an example of an optical axis of the headlight 3 in a case where a slope gradient increases ahead of the vehicle. As described above, in a case where the slope gradient increases ahead of the vehicle, the scene determining unit 12 determines that the gaze region indicated by the saliency map generated by the saliency map generating unit 11 is displaced upward, and determines that the scene is an uphill road. On the basis of the scene determination that the scene is an uphill road by the scene determining unit 12, the light distribution control determining unit 13 adjusts the optical axis of the headlight 3 upward of the vehicle with reference to the optical axis of the headlight 3 in a case where the vehicle is traveling on a flat road. Thus, it is possible to improve driver's visibility and prevent dazzling of traffic users around the vehicle.

Figure 6B:
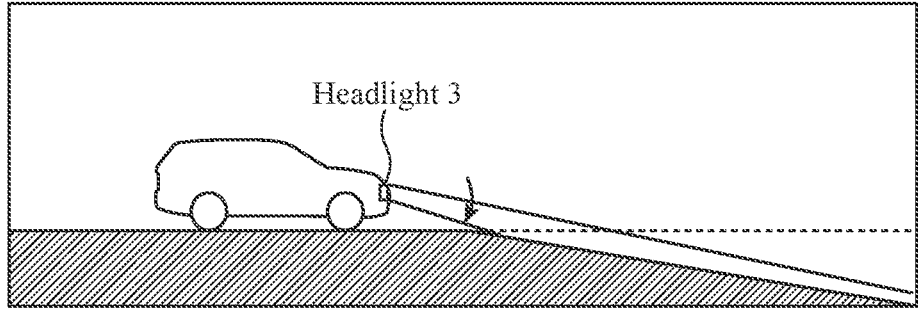
FIG. 6B illustrates an example of the optical axis of the headlight in a case where the slope gradient decreases ahead of the vehicle.

FIG. 6B illustrates an example of the optical axis of the headlight 3 in a case where the slope gradient decreases ahead of the vehicle. As described above, in a case where the slope gradient decreases ahead of the vehicle, the scene determining unit 12 determines that the gaze region indicated by the saliency map generated by the saliency map generating unit 11 is displaced downward, and determines that the scene is a downhill road. On the basis of scene determination that the scene is a downhill road by the scene determining unit 12, the light distribution control determining unit 13 adjusts the optical axis of the headlight 3 downward of the vehicle with reference to the optical axis of the headlight 3 in a case where the vehicle is traveling on a flat road. Thus, it is possible to improve driver's visibility and prevent dazzling of traffic users around the vehicle.

Hereinafter, a further specific example of the operation (step ST2) of the scene determining unit 12 according to the first embodiment will be described with reference to the drawings. In more detail, in the specific example, a method in which the scene determining unit 12 determines a scene related to a curve will be described. FIG. 7 illustrates an example of a saliency map in a case where the vehicle is traveling in a left curve section or a right curve section.

In this specific example, the scene determining unit 12 determines whether or not the scene is a right curve or a left curve on the basis of the displacement in the horizontal direction of the gaze region indicated by the saliency map generated by the saliency map generating unit 11.

Figures 7A, 7B:
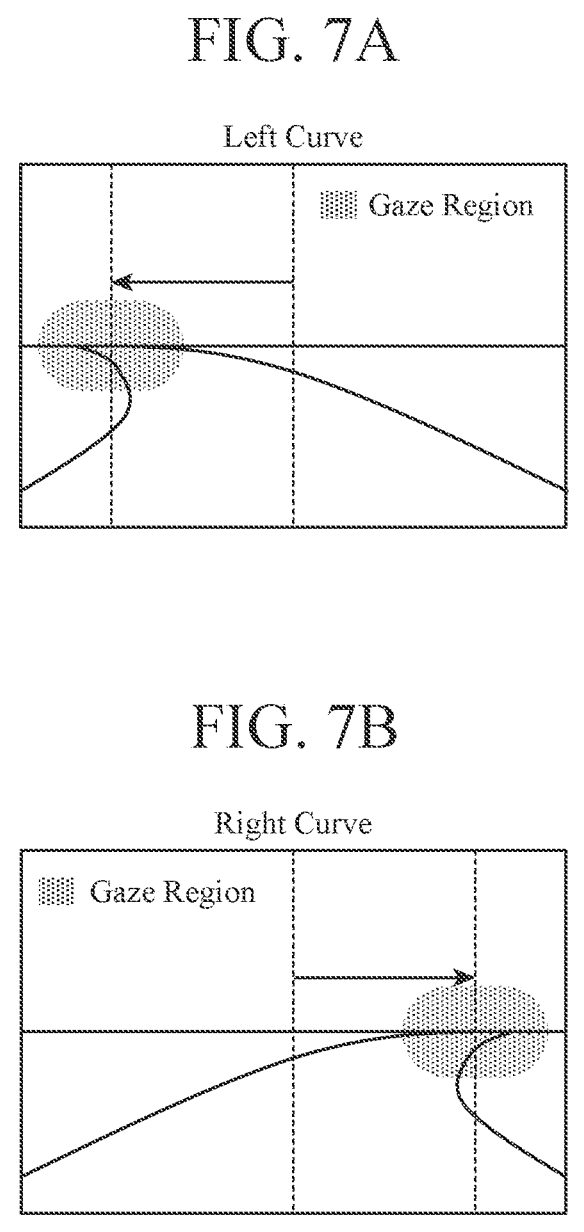

FIG. 7A illustrates an example of the saliency map in a case where the vehicle is traveling in a left curve section. FIG. 7A illustrates that, in a case where the road ahead of the vehicle curves to the left, the gaze region corresponding to the traveling direction of the vehicle is displaced to the left with reference to the gaze region in a case where the vehicle is traveling on a straight course. Therefore, when the gaze region indicated by the saliency map generated by the saliency map generating unit 11 is displaced leftward, the scene determining unit 12 determines that the scene is a left curve.

FIG. 7B illustrates an example of the saliency map in a case where the vehicle is traveling in a right curve section. FIG. 7B illustrates that, in a case where the road ahead of the vehicle curves to the right, the gaze region corresponding to the traveling direction of the vehicle is displaced to the right with reference to the gaze region in a case where the vehicle is traveling on a straight course. Therefore, when the gaze region indicated by the saliency map generated by the saliency map generating unit 11 is displaced rightward, the scene determining unit 12 determines that the scene is a right curve.

Hereinafter, a further specific example of an operation (step ST3) of the light distribution control determining unit 13 based on the scene determined by the scene determining unit 12 according to the first embodiment will be described with reference to the drawings. FIG. 8 illustrates an example of optical axis control in a case where the vehicle is traveling in a right curve or left curve section.

In this specific example, when the scene determining unit 12 determines that the scene is a right curve or a left curve, the light distribution control determining unit 13 adjusts the light distribution pattern so as to move the light emitted from the headlight 3 in the horizontal direction.

Figure 8A:
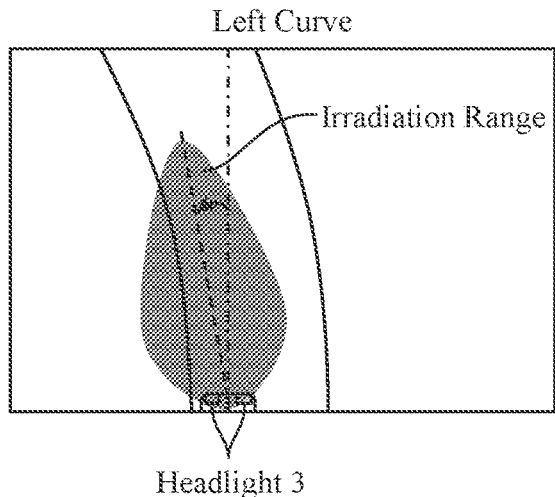
FIG. 8A illustrates an example of an optical axis of the headlight in a case where the vehicle is traveling in a left curve section.

FIG. 8A illustrates an example of an optical axis of the headlight 3 in a case where the vehicle is traveling in a left curve section. As described above, in a case where the vehicle is traveling on the left curve, the scene determining unit 12 determines that the gaze region indicated by the saliency map generated by the saliency map generating unit 11 is displaced leftward, and determines that the scene is the left curve. On the basis of the scene determination that the scene is a left curve by the scene determining unit 12, the light distribution control determining unit 13 adjusts the optical axis of the headlight 3 in the left direction of the vehicle with reference to the optical axis of the headlight 3 in a case where the vehicle is traveling straight. Thus, it is possible to improve driver's visibility and prevent dazzling of traffic users around the vehicle.

Figure 8B:
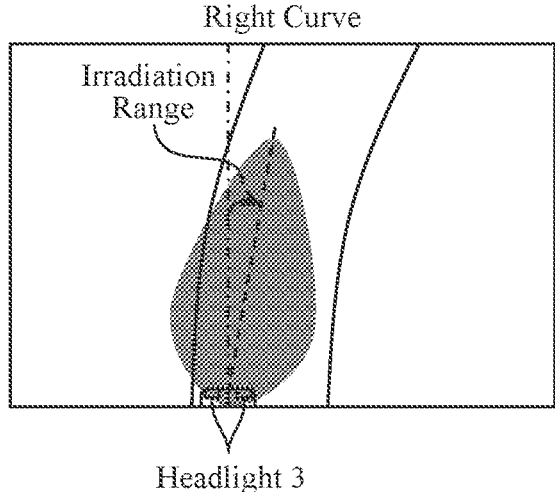
FIG. 8B illustrates an example of an optical axis of the headlight in a case where the vehicle is traveling in a right curve section.

FIG. 8B illustrates an example of the optical axis of the headlight 3 in a case where the vehicle is traveling in a right curve section. As described above, in a case where the vehicle is traveling on the right curve, the scene determining unit 12 determines that the gaze region indicated by the saliency map generated by the saliency map generating unit 11 is displaced rightward, and determines that the scene is on the right curve. On the basis of the scene determination that the scene is a right curve by the scene determining unit 12, the light distribution control determining unit 13 adjusts the optical axis of the headlight 3 to the right direction of the vehicle with reference to the optical axis of the headlight 3 in a case where the vehicle is traveling straight. Thus, it is possible to improve driver's visibility and prevent dazzling of traffic users around the vehicle.

Note that, as described above, the headlight control device 1 is connected to a computer network (for example, CAN) in the vehicle, and can appropriately acquire vehicle information. The vehicle information may include, for example, information indicating a speed of the vehicle, information indicating a steering angle, information indicating a brake, information of an illuminance sensor mounted on the vehicle, information of a raindrop sensor, information of a wiper switch, information indicating an operation state of the wiper, or the like. The scene determining unit 12 may determine a scene by referring to these pieces of vehicle information. The light distribution control determining unit 13 may determine the light distribution pattern by referring to these pieces of vehicle information.

As described above, with the headlight control device 1 according to the first embodiment, the scene determining unit 12 can specify the gaze region corresponding to the traveling direction of the vehicle that cannot be detected by the object detection by the conventional camera by using the saliency map for determining the scene, and can appropriately determine the scene to perform light distribution control. In addition, various sensors are not necessarily required, and it is possible to perform appropriate light distribution control by determining a scene with a simple configuration.

As described above, the headlight control device 1 according to the first embodiment is the headlight control device 1 that controls light distribution of the headlight 3 mounted on a vehicle, and includes the saliency map generating unit 11 to generate a saliency map indicating a gaze region that is a region easily gazed by a driver of the vehicle on the basis of an imaging signal indicating ahead of the vehicle, the scene determining unit 12 to determine a scene that is a situation in which the vehicle is traveling on the basis of the saliency map generated by the saliency map generating unit 11, and the light distribution control determining unit 13 to determine a light distribution pattern of the headlight 3 on the basis of the scene determined by the scene determining unit 12, and output a light distribution control signal for controlling the headlight 3 to emit light in the determined light distribution pattern.

With the above configuration, the scene that is the situation in which the vehicle is traveling is determined on the basis of the saliency map indicating the gaze region that is the region easily gazed by the driver of the vehicle, and the light distribution pattern is determined on the basis of the determined scene, whereby the light distribution of the headlight can be appropriately controlled so that the headlight irradiates the object gazed by the driver with light.

In recent years, an adaptive front lighting system (AFS) that automatically controls a headlight has been spreading for the purpose of improving driver's visibility according to driving scenes and preventing dazzling to traffic users around vehicles. The AFS is a system that automatically adapts a low beam (downward beam) and a high beam (main beam) to varying use conditions, and includes an automatic control function of low beam light distribution according to a road type such as a general road, an expressway, an urban area, or a wet road surface, an automatic control function of high beam light distribution adapted to the presence of an oncoming vehicle or a preceding vehicle (adaptive driving beam (ADB)), or an automatic control function of an optical axis following a curve.

For example, since the technique described in Patent Literature 1 described above is based on object detection using a camera, light distribution cannot be appropriately controlled in a case where a white line is not drawn or in a case where the white line is about to disappear. However, with the configuration of the headlight control device 1 according to the first embodiment, even in the case where the white line is not drawn or in the case where the white line is about to disappear on the basis of the saliency map, appropriate light distribution control can be implemented by appropriately determining the scene on the basis of the saliency map. In addition, by using the saliency map, it is possible to implement appropriate light distribution control by determining the scene without constructing a complicated system that performs scene determination based on rules in which various sensor signals are combined as in the prior art.

Second Embodiment

In a second embodiment, a configuration for determining a scene on the basis of an obstacle detection signal related to an obstacle with respect to a vehicle will be described.

Figure 9:
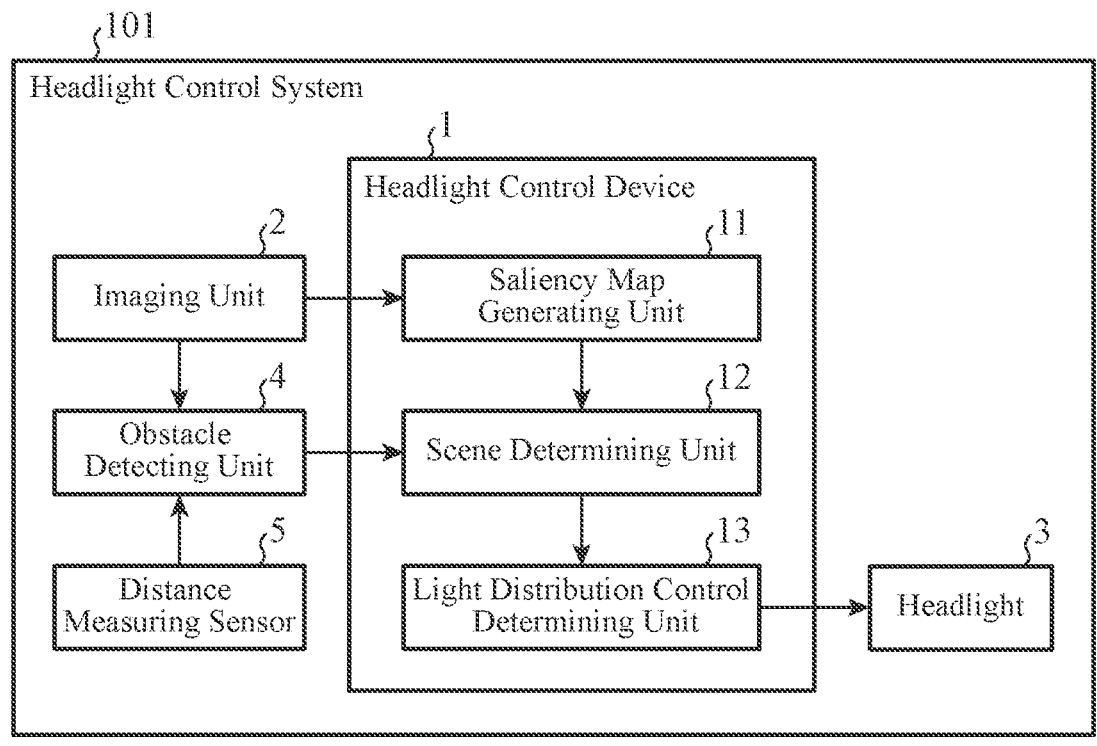
FIG. 9 is a block diagram illustrating a configuration of a headlight control system according to a second embodiment.

Hereinafter, the second embodiment will be described with reference to the drawings. Note that configurations having functions similar to those described in the first embodiment are denoted by the same reference numerals, and description thereof will be omitted. FIG. 9 is a block diagram illustrating a configuration of a headlight control system 101 according to the second embodiment. As illustrated in FIG. 9, the headlight control system 101 further includes an obstacle detecting unit 4 and a distance measuring sensor 5 as compared with the headlight control system 100 according to the first embodiment.

The distance measuring sensor 5 detects the periphery of the vehicle to acquire vehicle peripheral information related to the periphery of the vehicle. The distance measuring sensor 5 outputs the acquired vehicle peripheral information to the obstacle detecting unit 4. The distance measuring sensor 5 is, for example, a radar, a LiDAR, a ToF camera, an ultrasonic sensor, or the like configured to be capable of detecting an obstacle around the vehicle.

The obstacle detecting unit 4 generates an obstacle detection signal related to an obstacle with respect to the vehicle by detecting the obstacle with respect to the vehicle on the basis of the imaging signal converted by the imaging unit 2 or the vehicle peripheral information acquired by the distance measuring sensor 5. The obstacle detecting unit 4 outputs the generated obstacle detection signal to the scene determining unit 12 of the headlight control device 1.

The obstacle detection signal generated by the obstacle detecting unit 4 includes, for example, information regarding the type, position, size, orientation, or the like of the obstacle. The information regarding the type of the obstacle includes, for example, information regarding a vehicle, a truck, a motorcycle, a bicycle, a pedestrian, a sign, a signal, and the like.

Note that, although not illustrated, the obstacle detecting unit 4 may be configured inside the imaging unit 2, and the imaging signal and the obstacle detection signal may be output from the imaging unit 2. Alternatively, the obstacle detecting unit 4 may detect an obstacle by integrating an imaging signal received from the imaging unit 2 and information received from a plurality of types of sensors including other distance measuring sensors, and output the obstacle detection signal.

On the basis of the obstacle detection signal related to the obstacle with respect to the vehicle and the saliency map generated by the saliency map generating unit 11, the scene determining unit 12 according to the second embodiment specifies a compatible region that is a region where the obstacle does not exist and is a gaze region ahead of the vehicle. In more detail, in the second embodiment, the scene determining unit 12 specifies the compatible region on the basis of the obstacle detection signal generated by the obstacle detecting unit 4 and the saliency map generated by the saliency map generating unit 11.

Furthermore, the scene determining unit 12 determines a scene on the basis of the distribution pattern of the specified compatible region. More specifically, the scene determining unit 12 determines the scene on the basis of the position of the compatible region in a case where the compatible region exists, and determines the scene on the basis of the distribution pattern of the gaze region in a case where the compatible region does not exist, as does the scene determining unit 12 according to the first embodiment.

Note that, although not illustrated, in the headlight control method performed by the headlight control device 1 according to the second embodiment, as compared with step ST1-3 of the headlight control method performed by the headlight control device 1 according to the first embodiment, instead of step ST2, the scene determining unit 12 specifies a compatible region that is a region where the obstacle does not exist and is a gaze region ahead of the vehicle on the basis of the obstacle detection signal related to the obstacle with respect to the vehicle and the saliency map generated by the saliency map generating unit 11, and determines the scene on the basis of the distribution pattern of the specified compatible region.

Hereinafter, a specific example of the operation of the scene determining unit 12 according to the second embodiment will be described with reference to the drawings. FIG. 10 is a diagram in which a gaze region indicated by the saliency map and a region surrounding an obstacle indicated by the obstacle detection signal are superimposed.

Figure 10A:
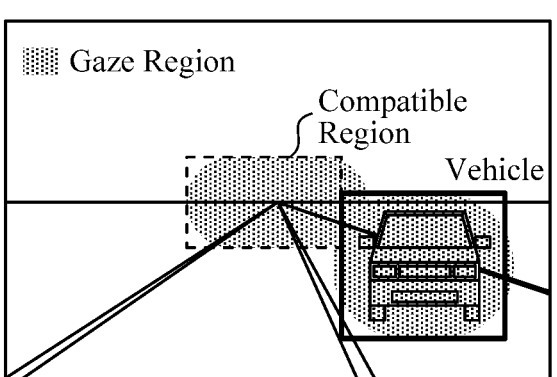
FIG. 10A is a diagram in which a gaze region and a region surrounding an obstacle are superimposed in a case where an oncoming vehicle is present.

FIG. 10A is a diagram in which the gaze region and the region surrounding the obstacle are superimposed in a case where an oncoming vehicle is present. FIG. 10B is a diagram in which the gaze region and the region surrounding the obstacle are superimposed in a case where a plurality of preceding vehicles is present. In any of these cases, the gaze region has a pattern that spreads in the horizontal direction as compared with a case where there are no oncoming vehicle and no plurality of preceding vehicles. Therefore, when the scene determining unit 12 performs the scene determination only on the basis of a spread in the horizontal direction of the distribution pattern of the gaze region, there is a possibility that the scene is erroneously determined to be an urban area instead of a general road or an expressway. However, as described above, the scene determining unit 12 specifies the compatible region and determines the scene on the basis of the distribution pattern of the specified compatible region, whereby the scene can be appropriately determined to be a general road or an expressway.

Figure 10C:
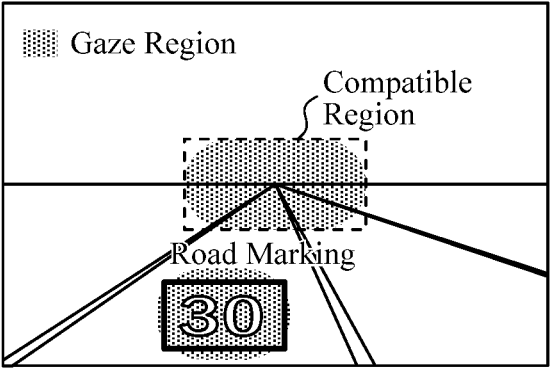
FIG. 10C is a diagram in which a gaze region and a region surrounding an obstacle are superimposed in a case where a road marking is present.
Figure 10B:
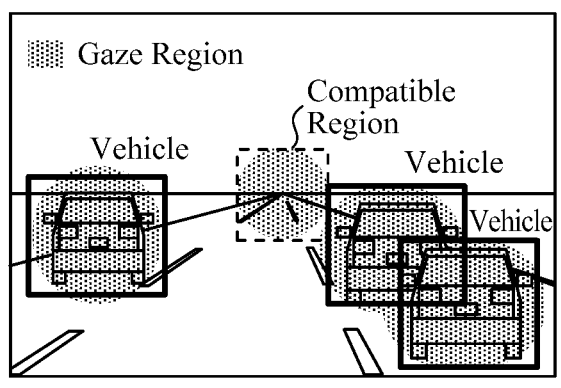
FIG. 10B is a diagram in which a gaze region and a region surrounding an obstacle are superimposed in a case where a plurality of preceding vehicles are present.
Figure 10D:
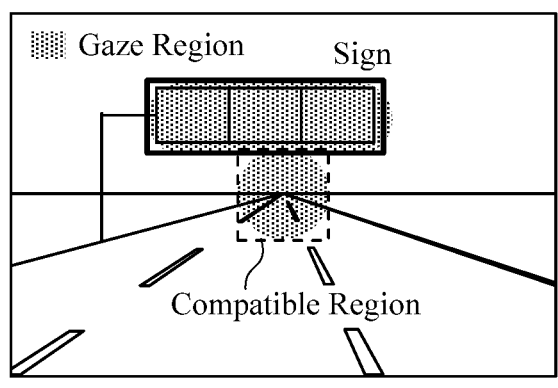
FIG. 10D is a diagram in which a gaze region and a region surrounding an obstacle are superimposed in a case where a sign is present.

FIG. 10C is a diagram in which the gaze region and the region surrounding the obstacle are superimposed in a case where a road marking is present. FIG. 10D is a diagram in which the gaze region and the region surrounding the obstacle are superimposed in a case where a sign is present. In these cases, a pattern in which the gaze region spreads in the vertical direction is obtained as compared with a case where there are no road marking and sign. Accordingly, when the scene determining unit 12 performs the scene determination only on the basis of the spread in the vertical direction of the distribution pattern of the gaze region, there is a possibility of performing erroneous determination that the scene is a slope having a gradient or erroneous determination that the scene is a wet road surface. However, as described above, the scene determining unit 12 specifies the compatible region and determines the scene on the basis of the distribution pattern of the specified compatible region, whereby the scene can be appropriately determined to be a general road or an expressway.

Figure 10E:
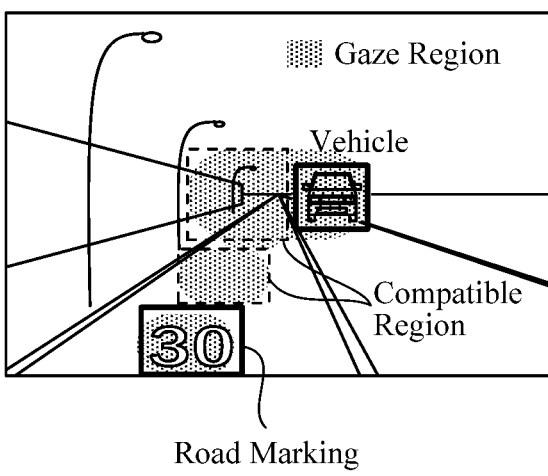
FIG. 10E is a diagram in which a gaze region and a region surrounding an obstacle are superimposed in a case where the vehicle is traveling on a wet road surface on which other traffic users are present.

FIG. 10E is a diagram in which a gaze region and a region surrounding an obstacle are superimposed in a case where the vehicle is traveling on a wet road surface on which other traffic users are present. As illustrated in FIG. 10E, in the saliency map generated by the saliency map generating unit 11, the gaze regions are distributed with respect to the traveling direction of the vehicle, another vehicle traveling in an opposite lane, and the reflection on the road surface. As illustrated in FIG. 10E, another vehicle traveling in the opposite lane is identified on the basis of the obstacle detection signal.

In the example illustrated in FIG. 10E, the scene determining unit 12 specifies the compatible region, and determines that the scene is a wet road surface in a case where the specified compatible region exists on the road surface. More specifically, in this example, the scene determining unit 12 specifies a region ahead in the traveling direction of the vehicle and a region of a reflected road surface as compatible regions. Furthermore, the scene determining unit 12 determines that the scene is on a wet road surface since a reflected region of the road surface exists on the road surface.

As described above, compared with the scene determining unit 12 according to the first embodiment, the scene determining unit 12 according to the second embodiment specifies the compatible region using not only the distribution pattern of the gaze region but also the gaze region and the obstacle detection signal, and performs scene determination from the position of the specified compatible region, so that the accuracy of scene determination can be improved as compared with the first embodiment.

Hereinafter, a further specific example of the operation of the scene determining unit 12 according to the second embodiment will be described with reference to the drawings. In more detail, in the further specific example, a configuration in which the scene determining unit 12 further specifies a near miss region will be described.

In the specific example, the scene determining unit 12 further specifies a near miss region, which is a region where a pedestrian is likely to jump out, on the basis of the specified position of the compatible region and the position of the obstacle indicated by the obstacle detection signal.

Figure 11:
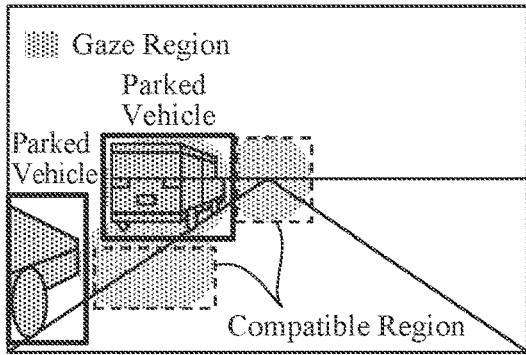
FIG. 11 is a diagram in which a gaze region and a region surrounding an obstacle are superimposed in a case where there are two parked vehicles on a road shoulder.

FIG. 11 is a diagram in which a gaze region and a region surrounding an obstacle are superimposed in a case where there are two parked vehicles on a road shoulder. As illustrated in FIG. 11, two parked vehicles on the road shoulder are detected by the obstacle detecting unit 4, and the gaze regions are distributed ahead in the traveling direction of the vehicle, the parked vehicle on the road shoulder, and in a space between the parked vehicles in the saliency map generated by the saliency map generating unit 11. In the example of FIG. 11, the scene determining unit 12 specifies a region ahead in the traveling direction of the vehicle and a space between parked vehicles as compatible regions on the basis of the obstacle detection signal and the saliency map. Furthermore, the scene determining unit 12 further specifies a space between the parked vehicles as a near miss region. As described above, by detecting the gaze region of the driver using the saliency map, it is possible to detect a blind spot region between the parked vehicles where the pedestrian is predicted to jump out, which cannot be detected by normal object detection. Therefore, when the compatible area is distributed behind an obstacle on the shoulder or at a position surrounded by the obstacle on the shoulder, the scene determining unit 12 can specify the compatible region as a near miss region.

Figure 12:
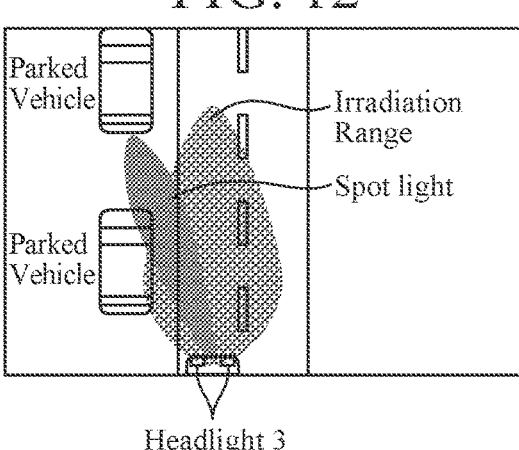
FIG. 12 is a diagram illustrating an example of light distribution control in a case where a near miss region is specified.

Hereinafter, a specific example of the operation of the light distribution control determining unit 13 based on the near miss region specified by the scene determining unit 12 according to the second embodiment will be described with reference to the drawings. FIG. 12 is a diagram illustrating an example of light distribution control in a case where the near miss region is specified.

In the specific example, the light distribution control determining unit 13 determines the light distribution pattern further on the basis of the near miss region specified by the scene determining unit 12. Here, the light distribution pattern determined by the light distribution control determining unit 13 is a light distribution pattern or the like in which the near miss region is irradiated with spotlight.

In a case where the light distribution control determining unit 13 acquires information regarding the near miss region, it is speculated that there is a high possibility that the near miss region is a region to which the driver should be alerted, such as a blind spot of an obstacle, and thus it is possible to alert the driver by emitting spot light or the like by the headlight 3. For example, as illustrated in FIG. 12, the light distribution control determining unit 13 performs light distribution control so that the headlight 3 emits spotlight to a region between two parked vehicles to call the driver's attention. Note that, although not illustrated, the headlight control device 1 according to the second embodiment uses the obstacle information based on the obstacle detection signal, as compared with the headlight control device 1 according to the first embodiment, so that it is possible to perform light distribution control so as not to inadvertently emit light to a place that causes distraction of the driver or to a surrounding traffic user. Examples of the place that causes distraction of the driver include an obstacle such as a parked vehicle on a road shoulder, a road sign, or a signal that may cause distraction or dazzling to the driver when irradiated with light.

As described above, the headlight control device 1 according to the second embodiment can specify the compatible region using the distribution pattern of the gaze region based on the saliency map and the obstacle information based on the obstacle detection signal as compared with the headlight control device 1 according to the first embodiment, and thus it is possible to improve scene determination performance and appropriately perform light distribution control as compared with the light distribution control determining unit 13 of the first embodiment using only the distribution pattern of the gaze region indicated by the saliency map.

Third Embodiment

In a third embodiment, a configuration for generating a saliency map using an infrared captured image as an imaging signal will be described.

Figure 13:
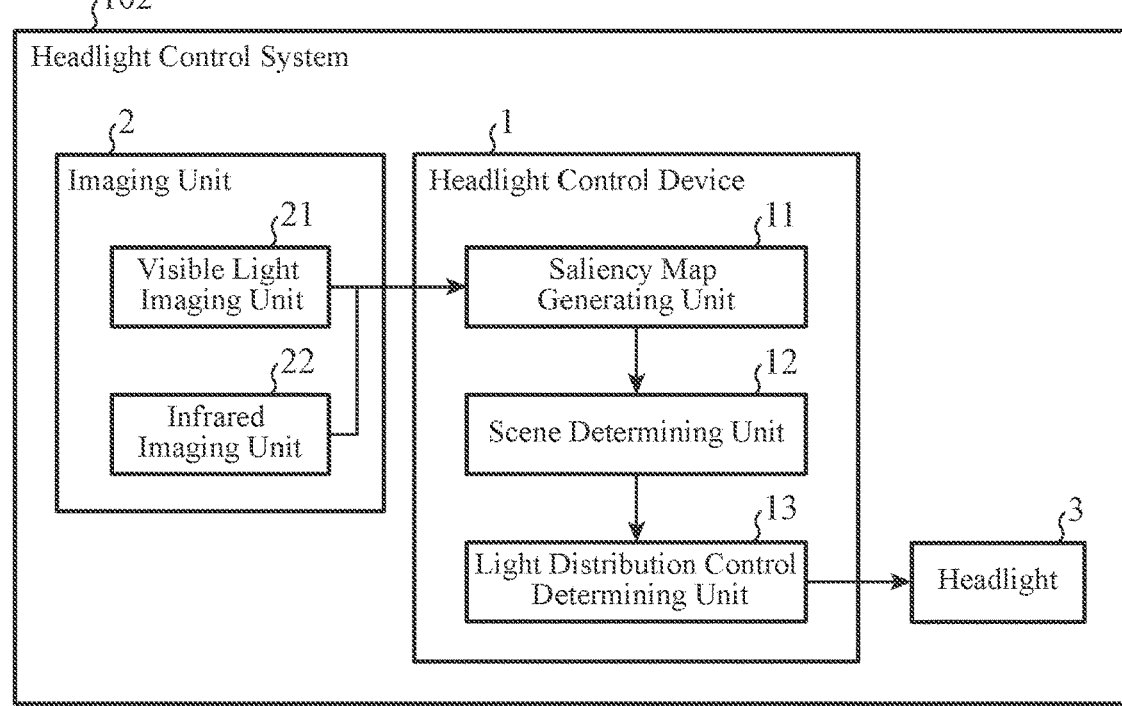
FIG. 13 is a block diagram illustrating a configuration of a headlight control system according to a third embodiment.

Hereinafter, the third embodiment will be described with reference to the drawings. Note that configurations having functions similar to those described in the first embodiment are denoted by the same reference numerals, and description thereof will be omitted. FIG. 13 is a block diagram illustrating a configuration of a headlight control system 102 according to a third embodiment. As illustrated in FIG. 13, in the headlight control system 102, the imaging unit 2 includes a visible light imaging unit 21 and one or more infrared imaging units 22 as compared with the headlight control system 100 according to the first embodiment.

The visible light imaging unit 21 images the front of the vehicle with visible light to acquire a visible light image indicating the front of the vehicle, and converts the acquired visible light image into a visible light imaging signal. The visible light imaging unit 21 outputs the converted visible light imaging signal to the saliency map generating unit 11. The visible light imaging unit 21 is, for example, a front monitoring camera that images the front of the vehicle.

The infrared imaging unit 22 images the front of the vehicle with infrared rays to acquire an infrared image indicating the front of the vehicle, and converts the acquired infrared image into an infrared imaging signal. The visible light imaging unit 21 outputs the converted infrared imaging signal to the saliency map generating unit 11. The infrared imaging unit 22 is, for example, a night-vision camera that images the front of the vehicle.

The saliency map generating unit 11 according to the third embodiment generates a saliency map on the basis of an infrared captured image as an imaging signal. In more detail, in the third embodiment, the saliency map generating unit 11 generates the saliency map on the basis of at least one imaging signal of the visible light imaging signal converted by the visible light imaging unit 21 or the infrared imaging signal converted by the infrared imaging unit 22.

Note that, although not illustrated, in the headlight control method performed by the headlight control device 1 according to the third embodiment, as compared with step ST1-3 of the headlight control method performed by the headlight control device 1 according to the first embodiment, instead of step ST1, the saliency map generating unit 11 performs a step of generating a saliency map indicating visual saliency ahead of the vehicle on the basis of the infrared imaging signal converted by the imaging unit 2.

Figure 14A:
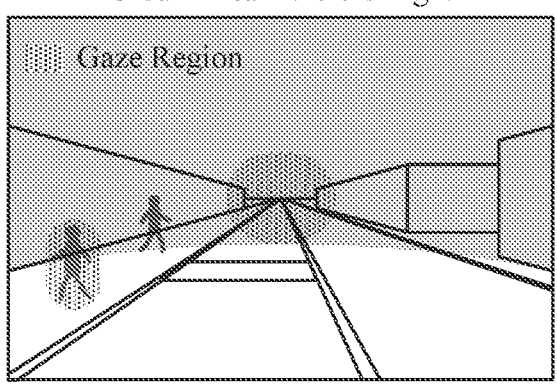
FIG. 14A is a diagram illustrating an example of a saliency map generated by a saliency map generating unit on the basis of a visible light imaging signal.
Figure 14B:
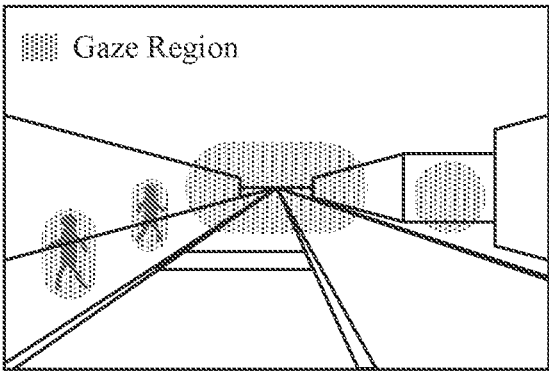
FIG. 14B is a diagram illustrating an example of the saliency map generated by the saliency map generating unit on the basis of the infrared imaging signal.

FIG. 14 is a diagram illustrating an example of the saliency map generated from the visible light imaging signal or the infrared imaging signal. FIG. 14A is a diagram illustrating an example of the saliency map generated by the saliency map generating unit 11 on the basis of the visible light imaging signal. FIG. 14B is a diagram illustrating an example of the saliency map generated by the saliency map generating unit 11 on the basis of the infrared imaging signal.

As compared with a visible light camera, an infrared camera has a feature of being less susceptible to surrounding illumination conditions. Therefore, in a case where the imaging unit 2 images ahead of the vehicle at night, the infrared camera image is not affected by the illumination conditions, and a clear image can be obtained at a farther place as compared with the visible light camera image.

As described above, by generating the saliency map using the infrared imaging signal, the saliency map generating unit 11 according to the second embodiment can generate the saliency map in which the influence of the surrounding illumination conditions is small and the distribution of the gaze region is more reproduced for a distant gaze target as compared with a case of generating the saliency map using the visible light imaging signal.

Note that the scene determining unit 12 according to the second embodiment described above may determine the scene on the basis of both the first saliency map generated on the basis of the visible light imaging signal by the saliency map generating unit 11 and the second saliency map generated on the basis of the infrared imaging signal by the saliency map generating unit 11. In this case, the scene determining unit 12 may determine the scene by comparing the first saliency map with the second saliency map.

As illustrated in FIGS. 14A and 14B, since the saliency map generated from the visible light imaging signal and the saliency map generated from the infrared imaging signal have different responses to a gaze target depending on the illumination conditions, it is possible to specify the target to be visually recognized by the driver whose visibility has been lowered due to the illumination conditions by comparing both saliency maps. In a case where there is an object to be visually recognized by the driver, the visibility of the driver can be improved by controlling the light distribution of the headlight 3 so that the object is included in the irradiation range.

As described above, the headlight control system 101 according to the third embodiment can image a surrounding object regardless of illumination conditions of the background when using the infrared imaging signal, as compared with a case where the visibility of the surrounding object is deteriorated by the illumination conditions around the vehicle or the illumination conditions around the surrounding object when using only the imaging signal of visible light. Thus, as compared with the headlight control device 1 of the first embodiment, the headlight control device 1 of the third embodiment can determine the scene and specify the near miss region regardless of the surrounding illumination conditions. In addition, by comparing the saliency map of visible light with the saliency map of infrared light, it is possible to implement control of the headlight 3 that improves the visibility of the driver.

Fourth Embodiment

In a fourth embodiment, a configuration for generating a saliency map on the basis of a position of a vehicle and three-dimensional map information will be described.

Figure 15:
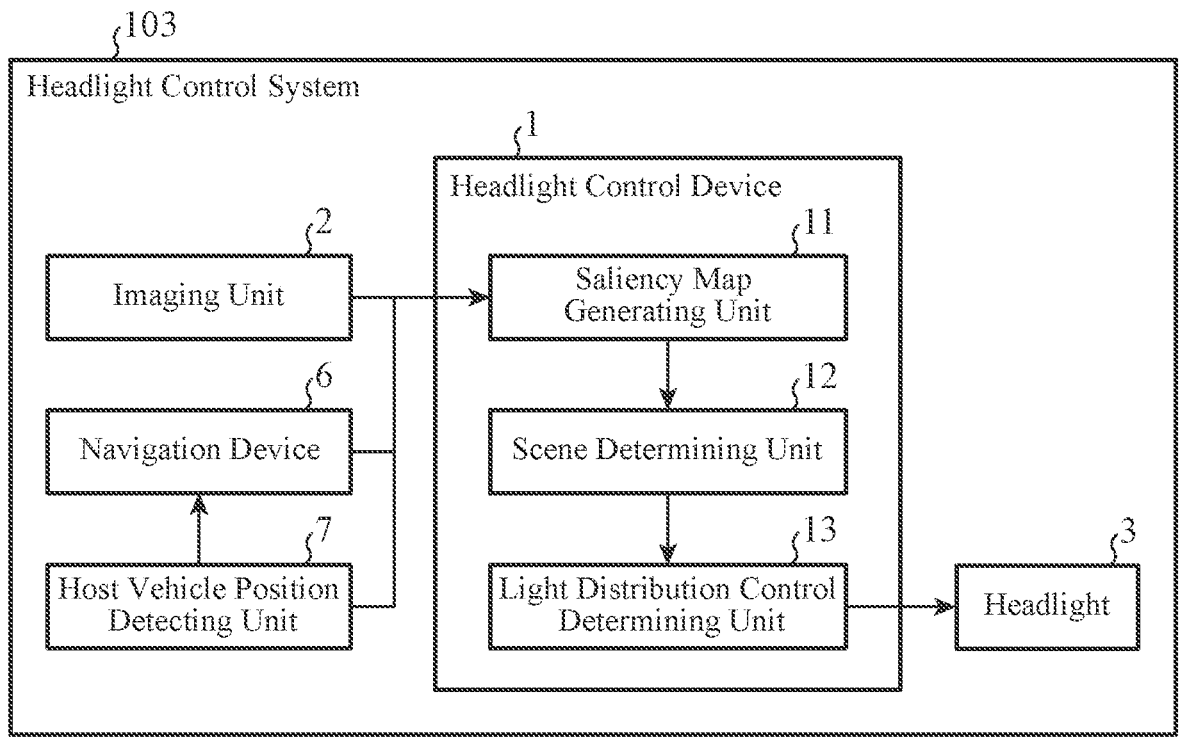
FIG. 15 is a block diagram illustrating a configuration of a headlight control system according to a fourth embodiment.

Hereinafter, a fourth embodiment will be described with reference to the drawings. Note that configurations having functions similar to those described in the first embodiment are denoted by the same reference numerals, and description thereof will be omitted. FIG. 15 is a block diagram illustrating a configuration of a headlight control system 103 according to a fourth embodiment. As illustrated in FIG. 15, the headlight control system 103 further includes a navigation device 6 and a host vehicle position detecting unit 7 as compared with the headlight control system 100 according to the first embodiment.

The host vehicle position detecting unit 7 acquires host vehicle position information by detecting the position of the vehicle (host vehicle). The host vehicle position detecting unit 7 outputs the acquired host vehicle position information to the navigation device 6 and the saliency map generating unit 11.

The host vehicle position detecting unit 7 is, for example, a GPS sensor. Thus, the current absolute position of the vehicle is specified. Note that, although detailed illustration and description are omitted, the host vehicle position detecting unit 7 may specify the current absolute position of the vehicle by a method combining autonomous navigation for obtaining a traveling locus of the vehicle using various in-vehicle sensors and radio wave navigation for obtaining the absolute position of the host vehicle using a GPS sensor.

The navigation device 6 generates three-dimensional map information around the vehicle on the basis of the host vehicle position information acquired by the host vehicle position detecting unit 7. The navigation device 6 outputs the generated three-dimensional map information to the saliency map generating unit 11.

The saliency map generating unit 11 according to the fourth embodiment generates the saliency map further on the basis of the position of the vehicle and the three-dimensional map information. In more detail, the saliency map generating unit 11 generates the saliency map on the basis of the position of the vehicle indicated by the host vehicle position information acquired by the host vehicle position detecting unit 7 and the three-dimensional map information generated by the navigation device 6.

The saliency map generating unit 11 according to the fourth embodiment can generate a more accurate saliency map by reducing the influence of the illumination conditions or the influence of the presence or absence of a surrounding object by generating the saliency map using the three-dimensional map information acquired from the navigation device 6.

The saliency map generating unit 11 may generate the saliency map further on the basis of the past saliency map generated in association with the position of the vehicle in the past. More specifically, the saliency map generating unit 11 may generate and record a saliency map associated with the position information by using the host vehicle position information. In this case, in a case where the saliency map generated in the past is recorded at the current vehicle position, the saliency map generating unit 11 generates the saliency map by referring to the saliency map generated in the past. For example, by referring to the saliency map generated when the vehicle travels in the daytime by the saliency map generating unit 11, the accuracy of the saliency map can be further improved as compared with the case of generating the saliency map only from the nighttime image. In addition, with reference to the difference in the saliency map according to the presence or absence of the obstacle, it is possible to improve the performance of scene determination or near miss detection.

Note that, although not illustrated, in the headlight control method performed by the headlight control device 1 according to the fourth embodiment, as compared with step ST1-3 of the headlight control method performed by the headlight control device 1 according to the first embodiment, instead of step ST1, the saliency map generating unit 11 performs a step of generating a saliency map indicating visual saliency ahead of the vehicle on the basis of the imaging signal converted by the imaging unit 2, the position of the vehicle, and the three-dimensional map information.

As described above, by storing the three-dimensional map image of the navigation device 6 and the saliency map associated with the host vehicle position information, the headlight control device 1 according to the fourth embodiment can generate the saliency map by referring to the saliency map generated in the past, and thus, it is possible to perform scene determination or near miss region description regardless of the surrounding illumination conditions or the presence or absence of an obstacle, as compared with the headlight control device 1 according to the first embodiment.

Fifth Embodiment

In a fifth embodiment, a configuration for generating a saliency map on the basis of vehicle speed information indicating a speed of a vehicle will be described.

Figure 16:
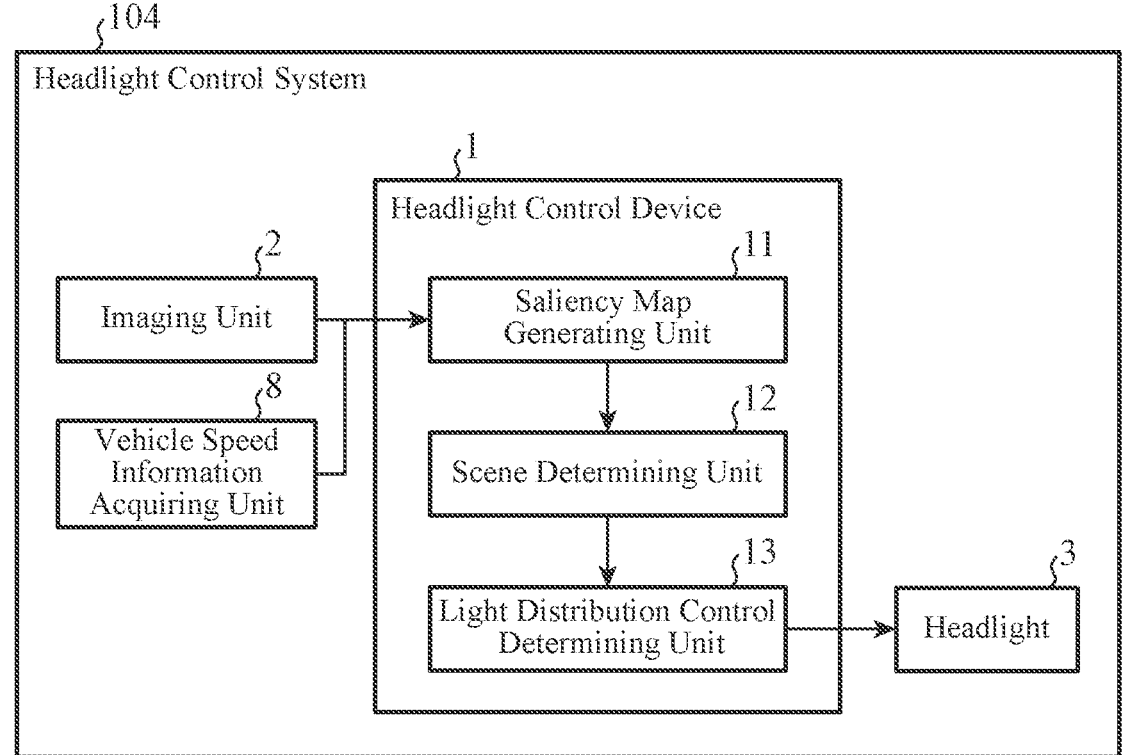
FIG. 16 is a block diagram illustrating a configuration of a headlight control system according to a fifth embodiment.

Hereinafter, a fifth embodiment will be described with reference to the drawings. Note that configurations having functions similar to those described in the first embodiment are denoted by the same reference numerals, and description thereof will be omitted. FIG. 16 is a block diagram illustrating a configuration of a headlight control system 104 according to a fifth embodiment. As illustrated in FIG. 16, the headlight control system 104 further includes a vehicle speed information acquiring unit 8 as compared with the headlight control system 100 according to the first embodiment.

The vehicle speed information acquiring unit 8 acquires vehicle speed information indicating the speed of the vehicle. The vehicle speed information acquiring unit 8 outputs the acquired vehicle speed information to the saliency map generating unit 11. More specifically, in the fifth embodiment, although not illustrated, the vehicle speed information acquiring unit 8 is connected to a computer network in the vehicle, and appropriately acquires vehicle speed information indicating a traveling speed of the vehicle from the vehicle.

The saliency map generating unit 11 according to the fifth embodiment generates the saliency map further on the basis of vehicle speed information indicating the speed of the vehicle. More specifically, as compared with the saliency map generating unit 11 according to the first embodiment, the saliency map generating unit 11 generates the saliency map on the basis of the imaging signal acquired from the imaging unit 2 and the vehicle speed information acquired from the vehicle speed information acquiring unit 8. Thus, it is possible to generate the saliency map reflecting the change in the gaze region of the driver according to the vehicle speed.

FIG. 17 is a diagram illustrating an example of the saliency map generating unit 11 generated on the basis of the imaging signal and the vehicle speed information by the saliency map generating unit 11 according to the fifth embodiment.

Figure 17A:
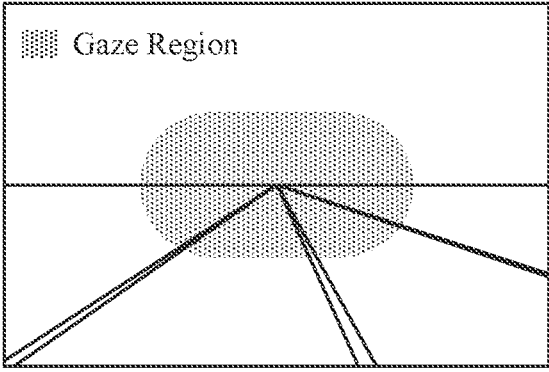
FIG. 17A is a diagram illustrating an example of a distribution of a gaze region in a saliency map generated by the saliency map generating unit on the basis of an imaging signal and vehicle speed information when the vehicle is traveling at a low speed.

FIG. 17A is a diagram illustrating an example of the distribution of the gaze region in the saliency map generated by the saliency map generating unit 11 on the basis of the imaging signal and the vehicle speed information when the vehicle is traveling at a low speed.

Figure 17B:
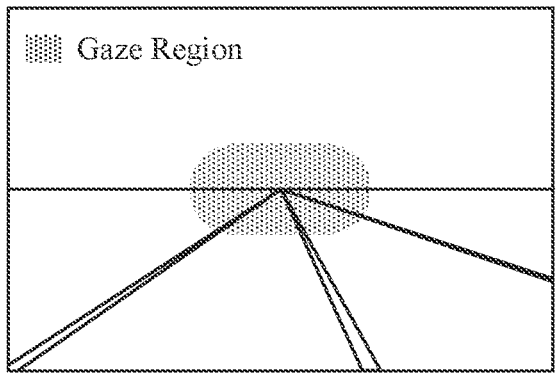
FIG. 17B is a diagram illustrating an example of the distribution of the gaze region in the saliency map generated by the saliency map generating unit on the basis of the imaging signal and the vehicle speed information when the vehicle is traveling at a middle speed.

FIG. 17B is a diagram illustrating an example of the distribution of the gaze region in the saliency map generated by the saliency map generating unit 11 on the basis of the imaging signal and the vehicle speed information when the vehicle is traveling at a middle speed.

Figure 17C:
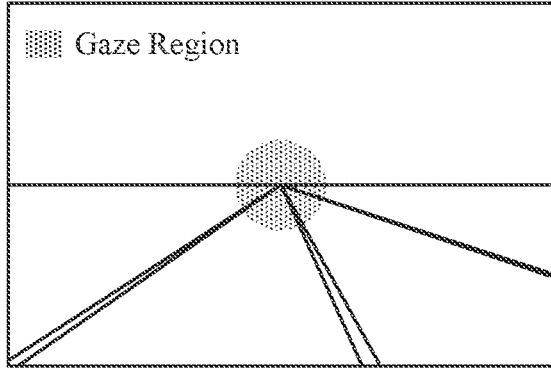
FIG. 17C is a diagram illustrating an example of the distribution of the gaze region in the saliency map generated by the saliency map generating unit on the basis of the imaging signal and the vehicle speed information when the vehicle is traveling at a high speed.

FIG. 17C is a diagram illustrating an example of the distribution of the gaze region in the saliency map generated by the saliency map generating unit 11 on the basis of the imaging signal and the vehicle speed information when the vehicle is traveling at a high speed.

As illustrated in FIGS. 17A, 17B, and 17C, the saliency map generating unit 11 generates the saliency map in which the faster the speed of the conductor. the narrower the gaze region corresponding to the traveling direction of the vehicle.

Note that, although not illustrated, in the headlight control method performed by the headlight control device 1 according to the fifth embodiment, as compared with step ST1-3 of the headlight control method performed by the headlight control device 1 according to the first embodiment, instead of step ST1, the saliency map generating unit 11 performs a step of generating a saliency map indicating visual saliency ahead of the vehicle on the basis of the imaging signal converted by the imaging unit 2 and the vehicle speed information indicating the speed of the vehicle.

As described above, since the saliency map generating unit 11 according to the fifth embodiment can generate the saliency map using the imaging signal and the vehicle speed information, reproduction accuracy of the gaze region of the driver based on the saliency map can be improved as compared with the saliency map generating unit 11 according to the first embodiment that generates the saliency map using only the imaging signal. Therefore, the scene determination performance using the saliency map can be improved.

Each of the functions of the saliency map generating unit 11, the scene determining unit 12, and the light distribution control determining unit 13 of the headlight control device 1 is implemented by a processing circuit. That is, the headlight control device 1 includes a processing circuit for executing the processing of each step illustrated in FIG. 2. The processing circuit may be dedicated hardware, or may be a central processing unit (CPU) that executes a program stored in a memory.

Figure 18A:
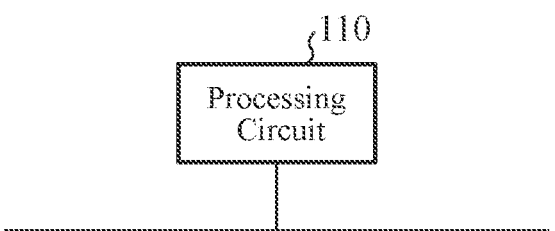
FIG. 18A is a block diagram illustrating a hardware configuration that implements functions of the light distribution control device.
Figure 18B:
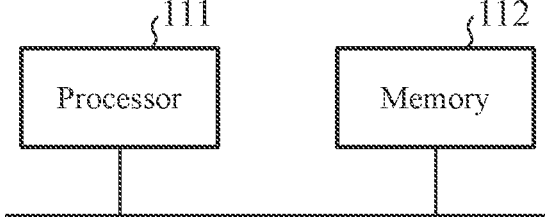
FIG. 18B is a block diagram illustrating a hardware configuration that executes software for implementing the functions of the light distribution control device.

FIG. 18A is a block diagram illustrating a hardware configuration that implements the functions of the headlight control device 1. FIG. 18B is a block diagram illustrating a hardware configuration that executes software that implements the functions of the headlight control device 1.

In a case where the processing circuit is the processing circuit 110 of dedicated hardware illustrated in FIG. 18A, the processing circuit 110 corresponds to, for example, a single circuit, a composite circuit, a programmed processor, a parallel programmed processor, an application specific integrated circuit (ASIC), a programmable logic device (PLD), a field-programmable gate array (FPGA), a system-on-a-chip (SoC), a system large-scale integration (LSI), or a combination thereof.

Each of the functions of the saliency map generating unit 11, the scene determining unit 12, and the light distribution control determining unit 13 of the headlight control device 1 may be implemented by separate processing circuits, or these functions may be collectively implemented by one processing circuit.

In a case where the processing circuit is the processor 111 illustrated in FIG. 18B, each of the functions of the saliency map generating unit 11, the scene determining unit 12, and the light distribution control determining unit 13 of the headlight control device 1 is implemented by software, firmware, or a combination of software and firmware.

Note that the software or firmware is described as a program and stored in the memory 112.

The processor 111 reads and executes the program stored in the memory 112 to implement each of the functions of the saliency map generating unit 11, the scene determining unit 12, and the light distribution control determining unit 13 of the headlight control device 1. That is, the headlight control device 1 includes the memory 112 for storing a program by which the processing of each step illustrated in FIG. 2 is executed as a result when each of these functions is executed by the processor 111.

These programs cause a computer to execute each procedure or method of the saliency map generating unit 11, the scene determining unit 12, and the light distribution control determining unit 13 of the headlight control device 1. The memory 112 may be a computer-readable storage medium storing a program for causing a computer to function as the saliency map generating unit 11, the scene determining unit 12, and the light distribution control determining unit 13 of the headlight control device 1.

The processor 111 corresponds to, for example, a central processing unit (CPU), a graphics processing unit (GPU), a microprocessor, a microcontroller, a digital signal processor (DSP), or the like.

The memory 112 corresponds to, for example, a semiconductor memory, a magnetic disk, or the like. More specifically, the memory 112 corresponds to a random access memory (RAM), a read only memory (ROM), a flash memory, an erasable programmable read only memory (EPROM), an electrically erasable programmable read-only memory (EEPROM), a solid state drive (SSD), a hard disk drive (HDD), or the like.

A part of each of the functions of the saliency map generating unit 11, the scene determining unit 12, and the light distribution control determining unit 13 of the headlight control device 1 may be implemented by dedicated hardware, and a part thereof may be implemented by software or firmware.

For example, the function of the saliency map generating unit 11 is implemented by a processing circuit as dedicated hardware. The functions of the scene determining unit 12 and the light distribution control determining unit 13 may be implemented by the processor 111 reading and executing a program stored in the memory 112.

As described above, the processing circuit can implement each of the above-described functions by hardware, software, firmware, or a combination thereof.

Note that free combinations of the respective embodiments, modifications of any components of the respective embodiments, or omissions of any components in the respective embodiments are possible.

Industrial Applicability

A headlight control device according to the present disclosure can appropriately control a light distribution of a headlight so that the headlight irradiates an object gazed by a driver with light, and thus the headlight control device can be used for AFS or the like that automatically controls a light distribution pattern of the headlight.

REFERENCE SIGNS LIST

1: headlight control device, 2: imaging unit, 3: headlight, 4: obstacle detecting unit, 5: distance measuring sensor, 6: navigation device, 7: host vehicle position detecting unit, 8: vehicle speed information acquiring unit, 11: saliency map generating unit, 12: scene determining unit, 13: light distribution control determining unit, 21: visible light imaging unit, 22: infrared imaging unit, 100, 101, 102, 103, 104: headlight control system, 110: processing circuit, 111: processor, 112: memory

The invention claimed is:

1. A headlight control device that controls light distribution of a headlight mounted on a vehicle, the headlight control device comprising:

the headlight being configured to change a light distribution pattern;

processing circuitry:

to calculate visual saliency on a basis of luminance, color or direction of imaging signals indicating ahead of the vehicle by applying deep learning including a neural network, and generate a saliency map indicating a distribution pattern of a gaze region that is a region gazed by a driver of the vehicle on a basis of the calculated visual saliency;

to determine a scene that is a situation in which the vehicle is traveling on a basis of a distribution pattern of gaze regions indicated by the saliency map generated by calculating probability density distribution of gazes in a horizontal direction and a vertical direction on a basis of the visual saliency map and by evaluating features of the calculated probability density distribution; and to determine the light distribution pattern of the headlight on a basis of the scene determined, and output a light distribution control signal for controlling the headlight to emit light in the determined light distribution pattern, wherein the headlight is controlled such that the light distribution pattern is changed based on the output light distribution control signal to irradiate an object in the gaze region with light.

2. The headlight control device according to claim 1, wherein the processing circuitry specifies a compatible region that is a region where an obstacle does not exist and is the gaze region ahead of the vehicle on a basis of an obstacle detection signal related to the obstacle with respect to the vehicle and the saliency map generated, and determines the scene on a basis of a distribution pattern of the specified compatible region.

3. The headlight control device according to claim 2, wherein the processing circuitry further specifies a near miss region, which is a region where a pedestrian is likely to jump out, on a basis of a specified position of the compatible region and a position of the obstacle indicated by the obstacle detection signal, and the processing circuitry determines the light distribution pattern further on a basis of the near miss region specified.

4. The headlight control device according to claim 2, wherein the processing circuitry determines that the scene is a wet road surface in a case where the specified compatible region exists on a road surface.

5. The headlight control device according to claim 1, wherein the processing circuitry determines whether or not the scene is a slope having a gradient on a basis of displacement in a vertical direction of a gaze region indicated by the saliency map generated, and when the processing circuitry determines that the scene is the slope, the processing circuitry adjusts the light distribution pattern so as to move the light emitted from the headlight in the vertical direction.

6. The headlight control device according to claim 1, wherein the processing circuitry determines that the scene is a general road, an expressway, or an urban area on a basis of a distribution pattern in a horizontal direction of a gaze region indicated by the saliency map generated.

7. The headlight control device according to claim 1, wherein the processing circuitry generates the saliency map on a basis of an infrared captured image as the imaging signal.

8. The headlight control device according to claim 1, wherein the processing circuitry generates the saliency map further on a basis of a position of the vehicle and three-dimensional map information.

9. The headlight control device according to claim 8, wherein the processing circuitry generates the saliency map further on a basis of a past saliency map generated in association with a position of the vehicle in the past.

10. The headlight control device according to claim 1, wherein the processing circuitry generates the saliency map further on a basis of vehicle speed information indicating a speed of the vehicle.

11. A headlight control system comprising:

a headlight control device according to claim 1;

an imager to acquire an image indicating ahead of the vehicle by imaging the front of the vehicle, and convert the acquired image into the imaging signal; and a headlight to emit light to the front of the vehicle in a light distribution pattern indicated by a light distribution control signal output.

12. A headlight control method performed by a headlight control device that controls light distribution of a headlight, configured to change a light distribution pattern, mounted on a vehicle, the headlight control method comprising:

calculating visual visible saliency on a basis of luminance, color or direction of imaging signals indicating ahead of the vehicle and generating by applying deep learning including a neural network, a saliency map indicating a distribution pattern of a gaze region that is a region easily gazed by a driver of the vehicle on a basis of the calculated visual saliency;

determining a scene that is a situation in which the vehicle is traveling on a basis of a distribution pattern of gaze regions indicated by the saliency map generated by calculating probability density distribution of gazes in a horizontal direction and a vertical direction on a basis of the visual saliency map and by evaluating features of the calculated probability density distribution; and determining the light distribution pattern of the headlight on a basis of the scene determined, and outputting a light distribution control signal for controlling the headlight to emit light in the determined light distribution pattern, wherein the headlight is controlled such that the light distribution pattern is changed based on the output light distribution control signal to irradiate an object in the gaze region with light.

\* \* \* \* \*